Oct. 24, 1939.　　　　　G. G. NEIDICH　　　　2,177,578
DUPLICATING APPARATUS
Filed March 5, 1937　　　10 Sheets-Sheet 1

Inventor
George G. Neidich
by his Attorneys
Howson & Howson

Oct. 24, 1939.	G. G. NEIDICH	2,177,578
DUPLICATING APPARATUS
Filed March 5, 1937	10 Sheets-Sheet 5

Oct. 24, 1939.  G. G. NEIDICH  2,177,578
DUPLICATING APPARATUS
Filed March 5, 1937   10 Sheets—Sheet 8

Inventor
George G. Neidich
by his Attorneys
Howson & Howson

Patented Oct. 24, 1939

2,177,578

UNITED STATES PATENT OFFICE 2,177,578

DUPLICATING APPARATUS

George G. Neidich, New York, N. Y.

Application March 5, 1937, Serial No. 129,275

18 Claims. (Cl. 101—132.5)

This invention relates to improvements in duplicating machines in which successive copies are prepared by bringing moistened copy sheets into engagement with a master sheet on which there has been produced matter to be transferred to the copy sheets. As is now well understood in the art, the said matter is produced on the master sheet by means of a substance which is soluble in a fluid with which the copy sheets are moistened.

The principal object of the present invention is to provide an improved duplicating machine which is simple and easy to operate and which is capable of producing copies more accurately and with less effort on the part of the operator than has been possible with prior devices, and which is capable of more rapid operation and is thus productive of a greater number of copies in a given time than are the prior devices of this type.

A more specific object of the invention is to provide novel means whereby the matter on the master sheet is reproduced on the copy sheets in a position corresponding exactly to the position of said matter on the master sheet. This result is accomplished without requiring effort or adjustment on the part of the operator other than the simple insertion of the successive copy sheets into the machine. Moreover, provision is made for the insertion of the copy sheets in the absence of pressure, and immediately following the insertion of a copy sheet, pressure is applied thereto to grasp the copy sheet securely, thus insuring that its position will be maintained in proper relation to the master sheet.

Another object of the invention is to provide novel means for attaching the master sheet to the master roll or drum, the said means being actuated by the operating means for the master roll.

Still another object of the invention is to provide novel means for controlling accurately the supply of moistening fluid to the copy sheets so that each copy sheet receives the proper amount of fluid, thus preventing or eliminating excessive moistening or insufficient moistening of the copy sheets. The control means also enables the operator to adjust or vary the fluid applied to the copy sheets to produce faint or heavy copies as desired. This enables conservation of the master sheet with the result that more copies may be produced from a single master sheet.

A further object of the invention is to provide a novel duplicating machine wherein all of the parts or elements which operate normally during the copying process are actuated by a common operating means which also serves to actuate the master roll. The said operating means is adapted for continuous operation by the operator and serves to actuate the master roll intermittently and also serves to actuate other elements while the master roll remains stationary. In this manner, provision is made for the insertion of a copy sheet at a predetermined time during each cycle of operation while the master roll is stationary.

Other objects and features of the invention will be apparent as the description proceeds.

Figure 1:
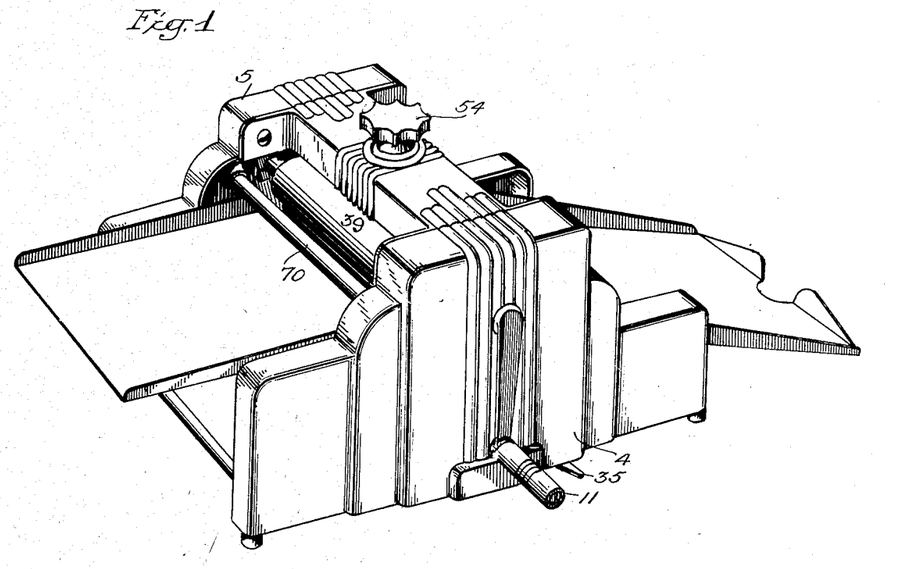
Fig. 1 is a perspective view of the complete machine.

The machine has the general appearance illustrated in Fig. 1, and in operation the copy sheets are fed into the machine from the left side as viewed in Fig. 1 and the crank handle 11 is rotated clockwise. The printed copy sheets emerge from the right side as viewed in Fig. 1. To facilitate operation, there are preferably provided removable pans on the opposite sides of the machine, as clearly shown, the pan at the left serving to support the copy sheets as they are inserted, and the inclined pan at the right being adapted to receive the copy sheets as they emerge from the machine.

Driving mechanism

Referring now to Figs. 2 to 5, the master roll 1 which is adapted to carry the master sheet is in the form of a hollow drum (see Fig. 5) carried upon a hollow shaft 2 which is rotatably mounted upon a solid shaft 3. The latter shaft is rotatably journaled in opposed walls 4 and 5 of the frame or casing. The shaft 3 carries a gear 6 which meshes with a gear 7 (see Fig. 2) carried upon a stud 8 which is supported by wall 4. The gear 7, in turn, meshes with a smaller gear 9 carried upon a stud 10 which is journaled in wall 4 and is rotatable by means of the operating crank handle 11. When the crank handle 11 is rotated clockwise, as mentioned above, the gear 9 is rotated clockwise and the gear 7 is, therefore, rotated counterclockwise, thus rotating gear 6 clockwise. The shaft 3 is, therefore, rotated clockwise and continues to rotate as long as the crank handle 11 is operated.

Figure 5:
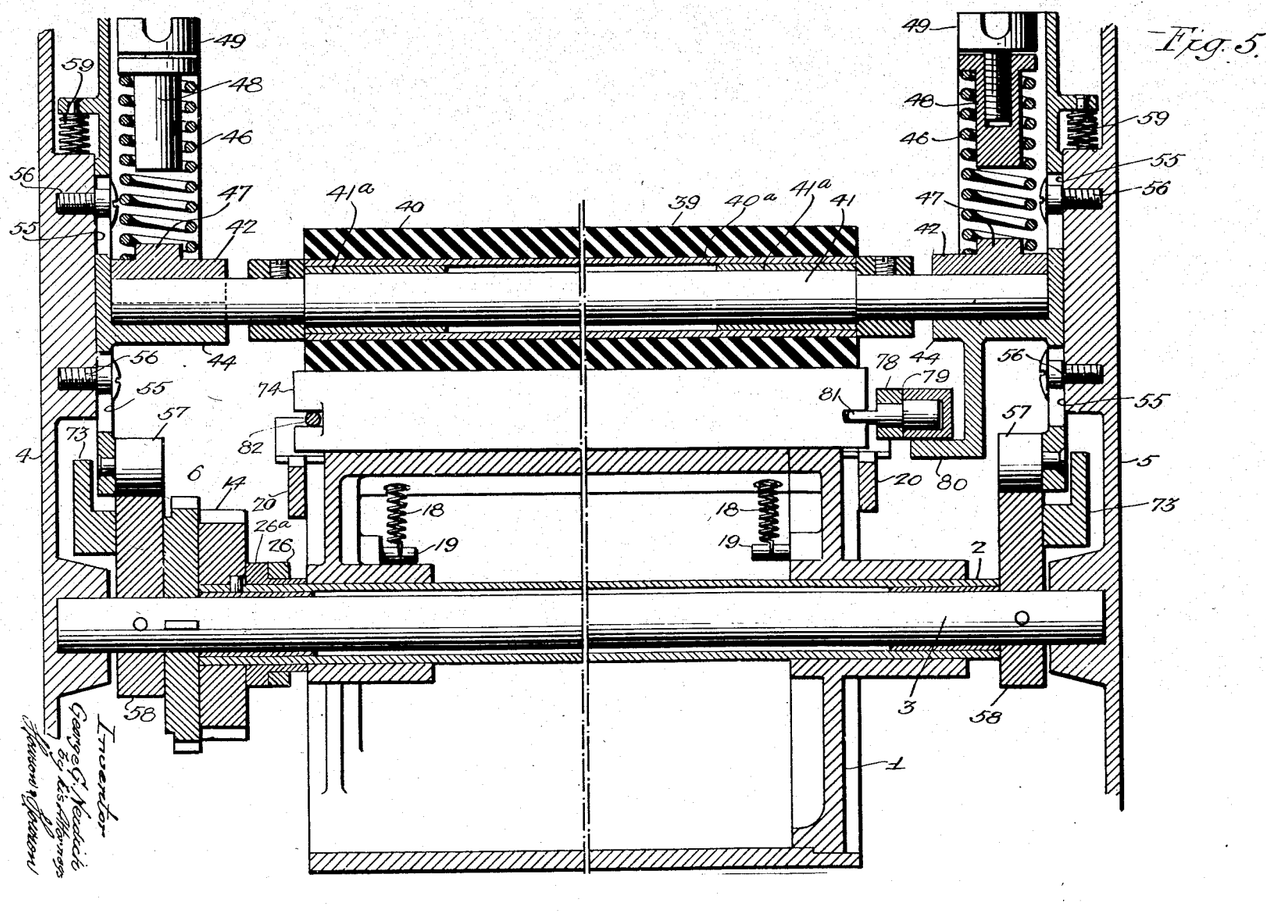
Fig. 5 is a sectional view taken along line 5—5 of Fig. 2.

A gear 12 is mounted on stud 8 and is attached to gear 7 so as to rotate therewith. The gear 12 is a discontinuous gear having teeth over a portion of its periphery and having a smooth peripheral surface 13 over the remaining portion of its periphery. This gear is adapted to mesh with a gear 14 disposed adjacent gear 6 but carried by the hollow shaft 2, as shown in Fig. 5. The gear 14 has teeth over a major portion of its periphery and has an arcuate surface 15 (see Fig. 2) which is complemental to the surface 13 of gear 12 and is adapted to cooperate therewith in a manner which will be described later.

Figure 2:
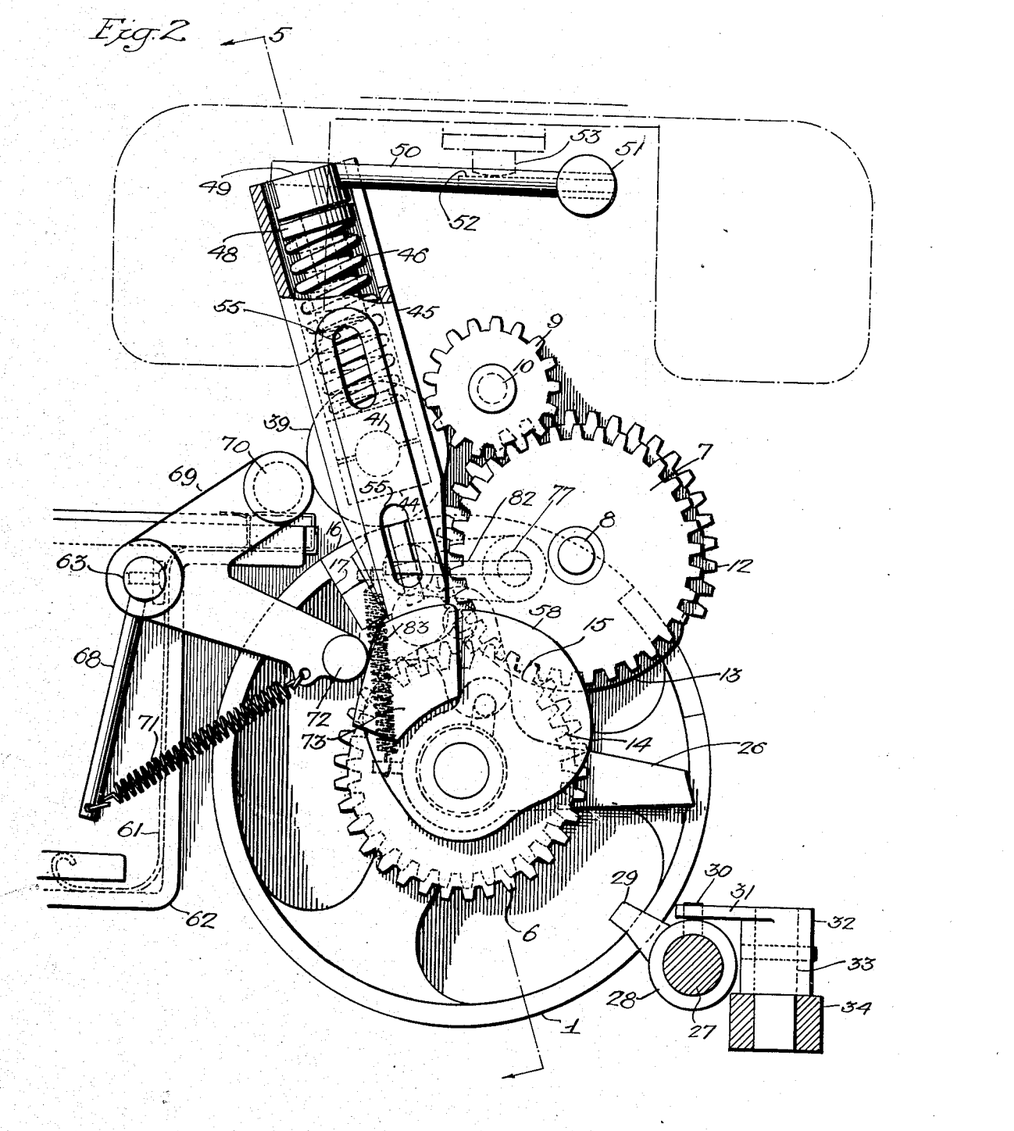
Fig. 2 is a sectional elevation taken from the side of the machine on which the operating crank is located.

During the portion of the operating cycle when the teeth of gear 12 mesh with the teeth of gear 14, the master roll or drum 1 is rotated in a clockwise direction, as viewed in Fig. 2, as will be apparent from the foregoing description. At a predetermined time in the cycle of operation, however, the smooth portion 13 of gear 12 comes into engagement with the complementary surface 15 of gear 14, and gear 14 stops and remains stationary while the surface 15 rides over the surface 13 of the rotating gear 12. It will be seen, therefore, that during a predetermined interval of each rotation of the continuously rotatable gear 12, the gear 14 will remain stationary. Therefore, the master roll or drum 1, which derives its rotation from the gear 14, remains stationary during the said interval. The reason for this will be understood as the description proceeds.

Attachment of master sheet

Figure 6:
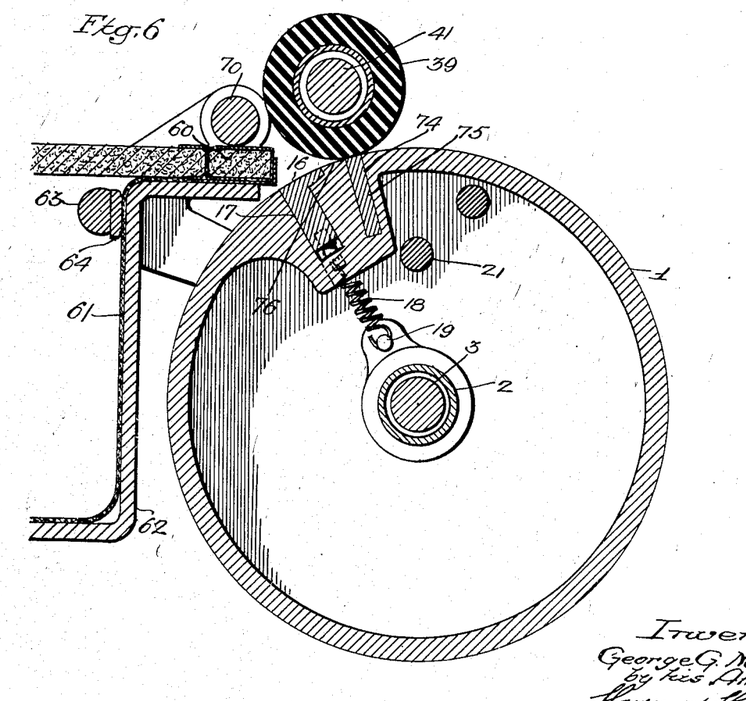
Fig. 6 is a detail sectional view taken transversely of the master roll and pressure roll.
Figure 15:
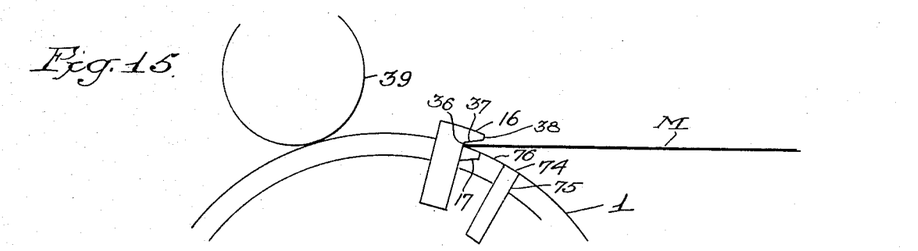
Figs. 15 to 18 are illustrative views showing the attachment of a master sheet to the master roll and the insertion of a copy sheet, and illustrating the alignment of the copy sheet with the master sheet.
Figure 16:
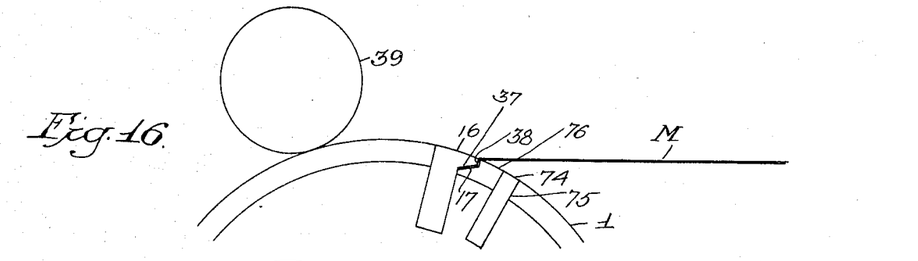
Figure 17:
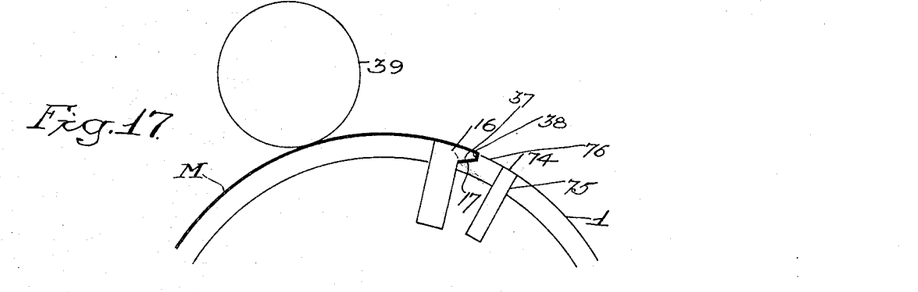

The master sheet is attached to the master roll or drum 1 by means of the clamp 16 shown clearly in Fig. 6. The clamp is shaped in cross section as clearly illustrated and extends the length of the roll 1 and is seated in a recess 17 of the roll, the recess being complementary in shape to the clamp so as to slidably seat the same. The clamp is normally held in its seated position by means of springs 18 (see Fig. 5) attached between the clamp and pins 19 carried within the interior of the hollow roll or drum 1. When the master sheet is in place, the forward edge portion of the sheet is secured by the clamp and the sheet extends over the clamp and around the roll 1 counterclockwise thereof, as viewed in Fig. 6. Since the master roll rotates in a clockwise direction, it is necessary to secure only the forward marginal edge portion of the master sheet, as will be well understood. Figs. 15 to 17 illustrate the manner of attachment of the master sheet which is shown at M.

Figure 7:
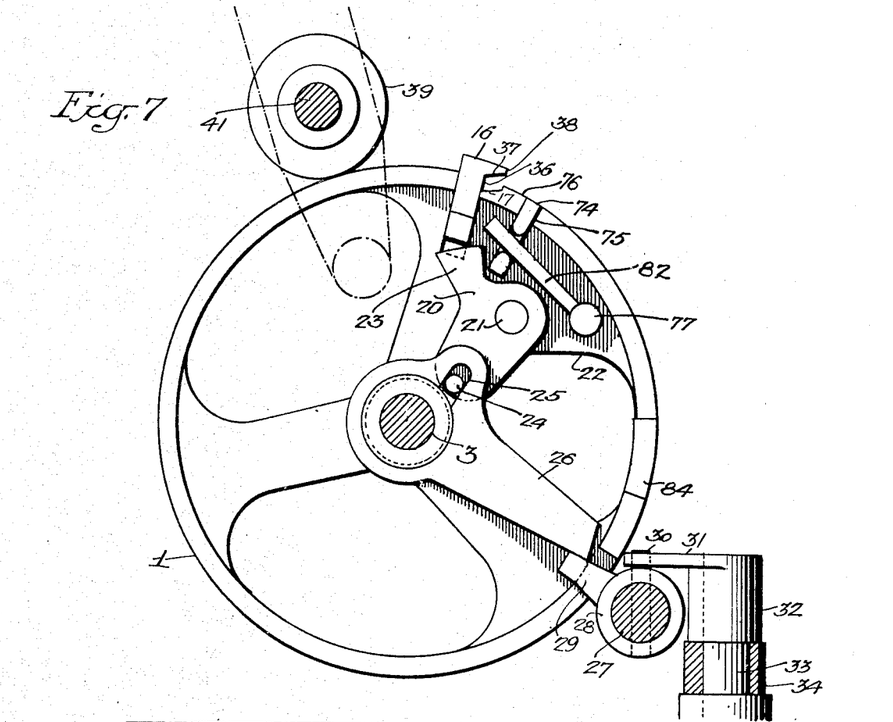
Fig. 7 is a detail sectional view taken at one end of the master roll and illustrating the operation of the master clamp.
Figure 8:
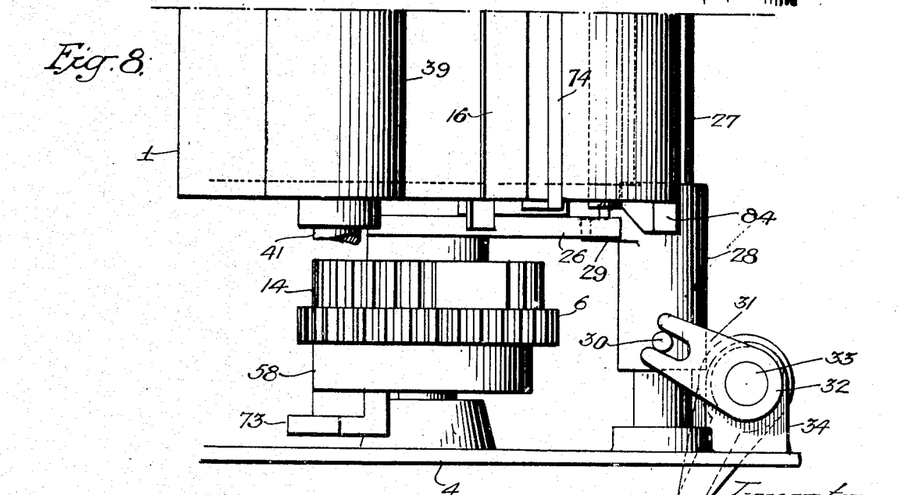
Fig. 8 is a fragmentary plan view taken just above the master roll and illustrating more clearly the actuating mechanism for the master clamp.

In order to move the clamp from its seating position to permit the removal or insertion of a master sheet, there are provided cam members 20 (see Figs. 5 and 7) which are mounted on the ends of shaft 21 extending longitudinally within the master roll and rotatably carried by flanges 22 at the ends of the master roll. As shown in Fig. 7, one of the cam members is in the form of a bell crank the arm 23 of which constitutes a cam while the other arm carries a pin 24 which is slidably seated in a slot 25 of an arm 26 which is mounted on a sleeve 26a (see Fig. 5) rotatably carried by the hollow shaft 2.

Adjacent to the periphery of the roll or drum 1, there is provided a rod 27 (see Figs. 3 and 7) upon which there is slidably mounted a sleeve 28 which carries an arm 29. The sleeve 28 also carries a pin 30 which is engaged by the bifurcated end of an arm 31 carried by sleeve 32 which is pinned to a rotatable stud 33 supported by bearing 34 which extends from wall 4. At its lower end, stud 33 carries an extending arm 35. It will be seen that by actuating the arm 35, the stud 33 may be rotated, thus causing the sleeve 28 to move the arm 29 into or out of cooperative relation with the arm 26. Normally, the arm 29 is removed from the path of arm 26 and, therefore, the latter arm may rotate freely with no affect upon the clamp 16. When the arm 29 is moved into the path of arm 26, however, the engagement of arm 26 with arm 29 causes the arm 26 to move counterclockwise relative to the master roll or drum as viewed in Fig. 7, thus moving the bell crank 20 clockwise and causing the cam 23 to move the clamp to raised position, as clearly illustrated. This opening of the clamp is effected by the operating crank 11 through the medium of the discontinuous gears above described which actuate the master roll. Thus, the clamp may be opened at will by the operating means for the master roll by simply actuating the arm or lever 35. This opening of the clamp occurs at a predetermined time in the operating cycle as will be described more fully hereinafter.

When the clamp is raised, as shown in Fig. 15, and the edge of a master sheet is inserted from the front of the clamp, the edge of the master sheet engages the surface 36 of the clamp, this surface acting as a stop to limit the inserting movement of the master sheet. When the clamp is closed, as shown in Fig. 16, a predetermined marginal portion of the master sheet is secured by the clamp, which portion is of a length equal to the sum of the lengths of the small surfaces 37 and 38 of the clamp.

Pressure roll assembly

Figure 14:
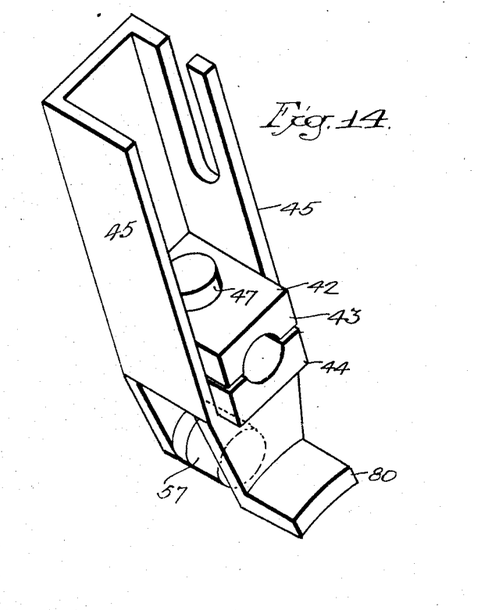
Fig. 14 is a fragmentary perspective view of one of the guide and bearing assemblies for the pressure roll shaft.

Arranged in cooperative relation with the master roll 1, there is provided the usual pressure or platen roll 39 which is adapted to press the successive copy sheets against the master sheet carried by the master roll, as well understood. The pressure or platen roll preferably comprises a hollow platen 40 (see Fig. 5) formed of material having some resiliency, such as rubber, and carried by a sleeve 40a which is rotatably and removably mounted on shaft 41 by means of bearings 41a. In accordance with the invention, the ends of the shaft 41 are carried by bearings 42, each of which comprises two separable halves 43 and 44 (Fig. 14). It is important to note that the provisions of the two sets of bearings 41a and 42 insures against binding and renders the platen 40 rotatable at all times. In other words, if the bearings 42 should bind the shaft 41, the platen 40 may still rotate. This structure also permits easy replacement of the platen 40, as described hereinafter.

Figure 12:
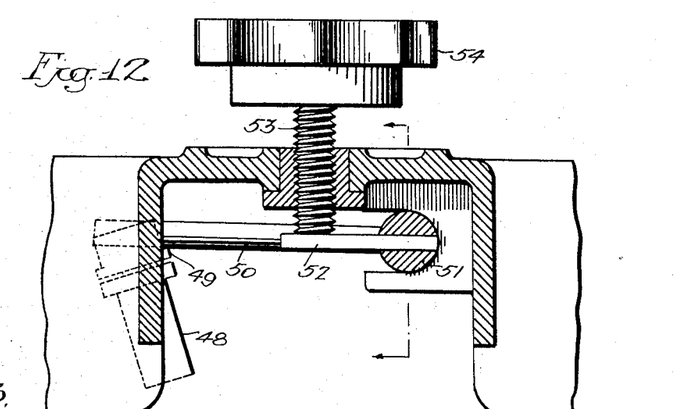
Figs. 12 and 13 are fragmentary sectional views illustrating the pressure-adjusting mechanism for the pressure roll.
Figure 13:
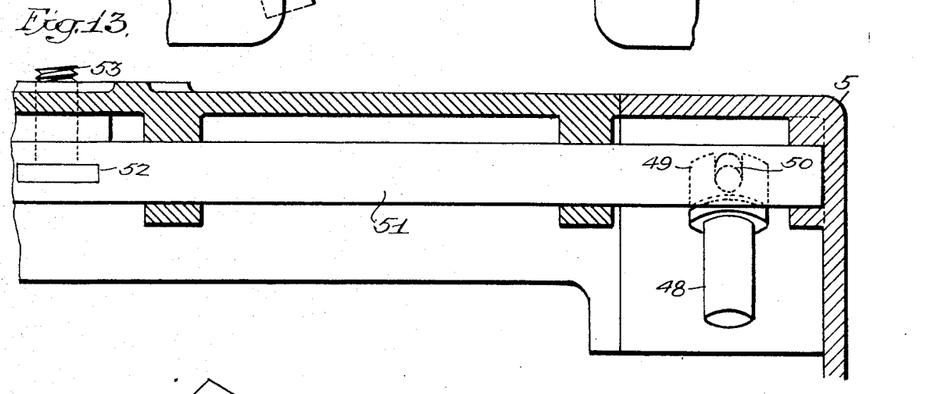

The lower bearing halves 44 are integral with guides 45 in which the upper bearing halves 43 are slidably seated and are urged downward by springs 46 (Fig. 5). The springs 46 are seated within the guides 45, the lower end of each spring being held in position by a lug 47 on the associated bearing member 43 and the upper portion of each spring being held in place by a pin 48 adjustably carried by screw 49. The flange at the upper end of pin 48 engages the end of the spring and the pin also serves to prevent distortion of the spring. Each of the heads of the screws 49 is recessed to receive an arm 50 (Fig. 2) carried by a rotatable shaft 51 journaled in walls 4 and 5 (Fig. 13). An arm 52 (see Fig. 12) also carried by the shaft 51 is engaged by an adjustable screw 53 attached to knob 54. By rotating the knob 54, the shaft 51 may be set in various angular positions and the compression of springs 46 may thus be varied. It will be seen, therefore, that the springs 46 exert predetermined pressure on the shaft of the pressure roll 39, which pressure may be varied at will to vary the pressure on the copy sheets. It will be noted also that the pressure of the springs may be varied by adjusting the pins 48, which enable equalizing of the pressure of the springs.

By virtue of the sectional bearing structure above described, the bearing parts 43, the springs 46, and the pressure roll 39 may be readily removed from the guides 45. In order to do this, it is simply necessary to compress the springs 46 sufficiently to permit removal of the parts from the guides. By means of this construction, it is possible to readily replace worn parts. Since the platen is susceptible to wear and usually requires replacement at regular intervals, this feature is very important.

The guides 45 are slidably mounted upon the opposed walls 4 and 5 of the frame or casing. To this end, the guides are provided with slots 55 (Fig. 5) within which there are seated screws 56 carried by the walls 4 and 5. Each of the guides is provided at its lower end with a roller 57 and each roller is engaged by a cam 58 carried by the shaft 3. The cams 58 are adapted to move the guides 45 upward at a predetermined time in the cycle of operation to thus move the pressure roll 39 away from the master roll to permit insertion of a fresh copy sheet during each cycle of operation, as described further hereinafter. Normally, the guides are held in their lowermost positions by means of the springs 46 and the upward movement of the guides by the cams 58 is against the action of these springs. There are also provided springs 59 which serve to hold the bearing parts 44 in snug engagement with the shaft 41 to prevent chatter and reduce bearing wear.

Moistening mechanism

The copy sheets are moistened by being passed over the moistening device 60 (Fig. 9) as the sheet is being fed toward the master roll. The moistening device comprises a strip of absorbent material arranged in the path of the copy sheet, and moistening fluid is supplied to the moistening device by means of capillary wicks 61, the upper ends of which engage the moistening device, while the lower ends of the wicks are disposed within the reservoir 62 containing the moistening fluid. A rod or shaft 63 extends transversely through the reservoir 62 adjacent to the wicks 61 and is journaled in opposed walls of the reservoir or fluid tank. The shaft 63 is eccentric in cross section and may be formed in two parts, as illustrated, or as an integral unit to provide the cam surface 64 extending the full length of the shaft which controls the capillary flow of fluid through the wicks 61. When the cam surface 64 is not in contact with the wicks, as in Fig. 9, the capillary flow of fluid upward through the wicks is substantially unaffected and maximum capillary flow of the fluid obtains. When the shaft 63 is rotated counterclockwise, however, as viewed in Fig. 9, the cam surface 64 is brought into engagement with the wicks and exerts pressure upon the wicks, thus decreasing the capillary action thereof and diminishing the capillary flow of the fluid through the wicks.

Figure 9:
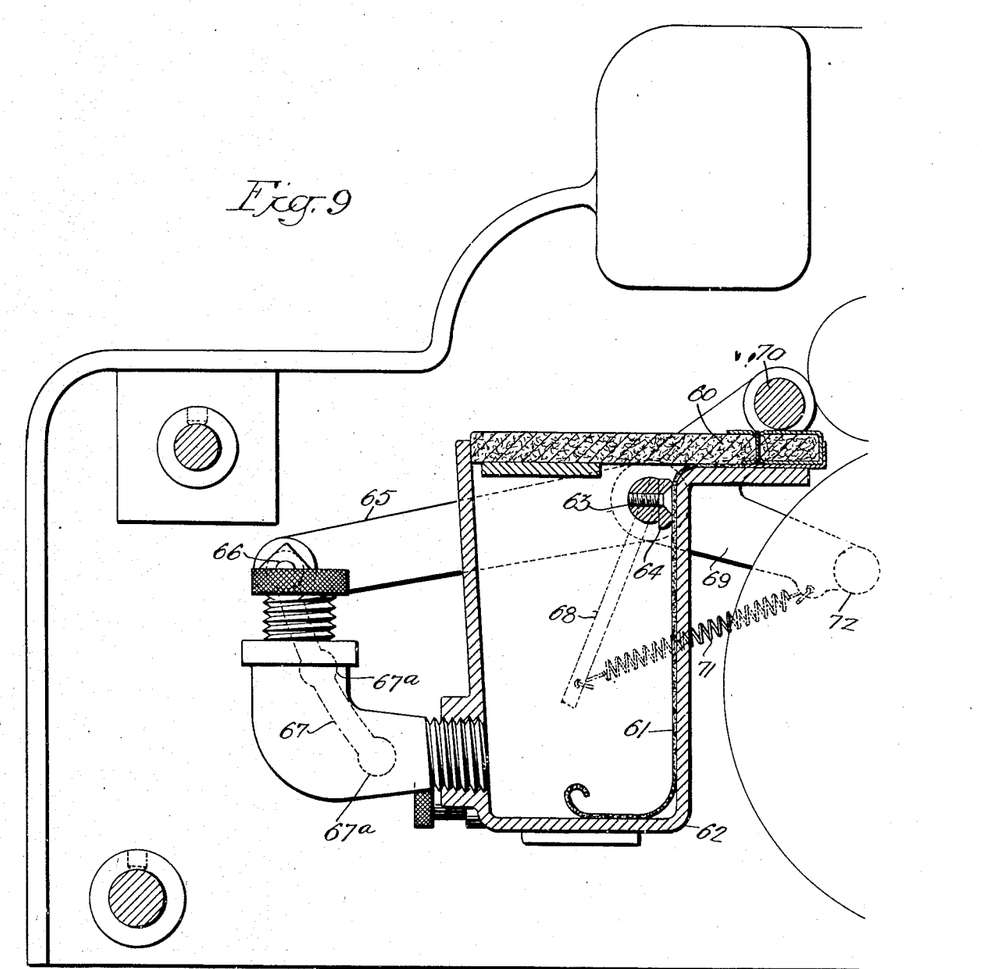
Fig. 9 is a fragmentary sectional view illustrating the moistening mechanism.
Figure 10:
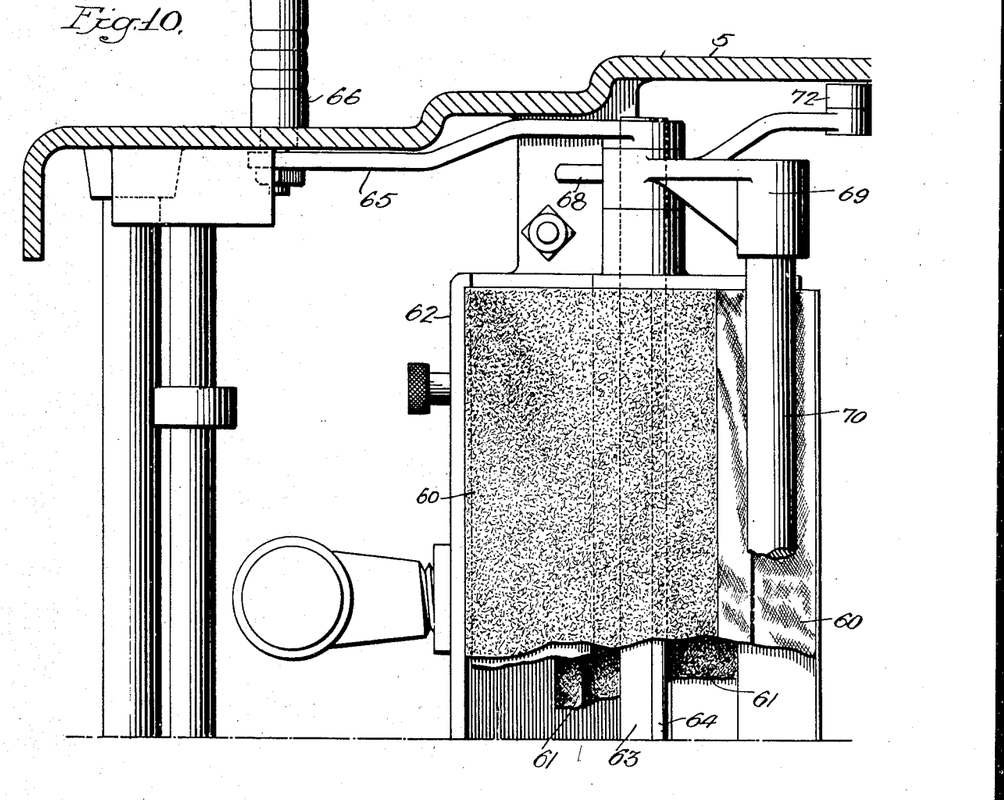
Fig. 10 is a fragmentary sectional plan view illustrating the same mechanism.
Figure 11:
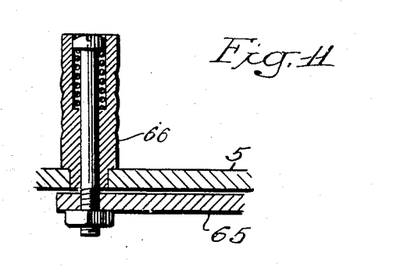
Fig. 11 is a fragmentary sectional view showing the structure of the adjustment handle of the moistening mechanism.

At one of its ends, the shaft 63 carries an arm 65 which in turn carries a handle 66, one end of which is adapted to ride in a slot 67 having seating recesses 67a in which the handle 66 may be selectively seated manually (see Figs. 10 and 11). On the ends of shaft 63, there are also provided pins 68 and loosely mounted bell cranks 69 (Fig. 9), the upper arms of which carry a pressure bar 70. The lower arms of the bell cranks are attached through springs 71 to the pins 68. These springs serve to urge the bell cranks clockwise, as viewed in Fig. 9, thus urging the pressure bar 70 against the moistening device 60. The lower arms of the bell cranks also carry rollers 72 (Fig. 3) which are engageable by cams 73 disposed adjacent cams 58 and carried thereby. The cams 72 raise the rollers 72 at a predetermined time during each cycle of operation, thus rotating the bell cranks 69 against the action of springs 71 and lifting the pressure bar 70 to permit insertion of a fresh copy sheet. The pressure bar is shown in its raised position in Fig. 3.

When the handle 66 is disposed as shown in Fig. 9 so that the cam surface 64 is not in contact with the wicks 61, the tension of springs 71 is a maximum so that the pressure bar 70 exerts maximum pressure on the copy sheet as the sheet is fed toward the master roll. In other words, when the capillary flow of moistening fluid through the wicks 61 is unobstructed and is a maximum, the pressure exerted by pressure bar 70 upon the copy sheet is likewise a maximum and the sheet will be given maximum moistening treatment with the result that a heavy copy will be made when the sheet engages the master sheet. When the handle 66 is disposed so that the cam surface 64 engages the wicks, however, the tension of springs 71 will be diminished, thus diminishing the pressure exerted by the pressure bar 70 at the same time that the capillary flow of moistening fluid is diminished. Under such circumstances, the copy will be light. Thus by varying the position of handle 66, the machine may be made to produce light or heavy copies as desired.

Alignment of copy sheet with master sheet

In cooperative association with the clamp 16 (Fig. 7) and disposed forwardly thereof, there is provided a guide or stop 74 which extends substantially the length of the master roll or drum and is slidably seated in a recess 75 of the master roll. This guide or stop is adapted to be raised at a predetermined time during the operating cycle (see Fig. 18) and serves to limit the insertion of a copy sheet and to align the copy sheet with the master sheet. The guide or stop 74 is so positioned relative to the clamp 16 that the small surface area 76 of the roll 1 between the recesses 17 and 75 is of a circumferential dimension equal to the sum of the lengths of the surfaces 37 and 38 of the clamp. It will be seen, therefore, that when a copy sheet is inserted with its forward edge abutting against the raised guide or stop 74, the copy sheet will be exactly aligned with the master sheet. This may be seen more clearly from Fig. 18 which illustrates the insertion of a copy sheet C against the stop 74. When the pressure roll 39 is lowered to press the copy sheet against the master roll, as described hereinafter, the portion X of the copy sheet which engages the surface area 76 is equal in length to the sum of the lengths of the portions Y and Z of the master sheet beneath the clamp 16. This is an important feature of the invention since it insures that each copy sheet will exactly duplicate the master sheet and all of the copy sheets will be aligned exactly alike. Moreover, this desirable result is accomplished with no effort on the part of the operator.

In order to operate the guide or stop 74, there is provided a shaft 77 (Fig. 7) which extends longitudinally through the hollow drum 1 and is rotatably carried thereby. At one end of the shaft 77 there is provided an arm 78 (Fig. 4) carrying a roller 79 which is adapted to ride over a shoe 80 carried by one of the guides 45. The stud or pin of roller 79 has a projection 81 which extends into a recess in the end of guide 74. At the other end of shaft 77 there is provided a pin 82 which extends into a slot or recess at the other end of the guide 74. The parts are so arranged that the roller 79 rides over the shoe 80 at the same time that the cams 58 raise the guides 45. Since the shoe 80 is carried upward by the guide carrying it, the projection 81 and pin 82 are caused to lift the guide or stop 74. At such time, the master roll is stationary and the guide 74 is directly beneath the pressure roll 39 and follows the pressure roll upward as may be seen from Fig. 3. Normally, the guide 74 is held in its seated position shown in Fig. 2 by means of springs 83.

Operation

Considering the sequency of operation of the parts, let it be assumed that there is no master sheet on the master roll. The first step is, of course, to attach the master sheet in place. This is done by rotating the operating crank 11 in a clockwise direction, as viewed in Fig. 1, after the arm 29 (Fig. 7) has been moved to operative position by the arm 35. When the arm 26 abuts against the arm 29, as shown in Fig. 7, the clamp 16 is raised as illustrated. At such time, the clamp is in the position shown clearly in Fig. 15 just forward of the pressure roll 39. The master sheet is inserted as above described, and the crank 11 is again rotated. When the cam 84 on the end of drum 1 engages the arm 29, this arm is moved to its inoperative position. The clamp returns to its closed position, clamping the edge portion of the master sheet, as shown in Fig. 16. The machine is now ready for operation. During the duplication of successive copy sheets using the master sheet which has been attached to the master roll, the arm 29 will remain in inoperative position and, therefore, the clamp 16 will remain closed.

Figure 3:
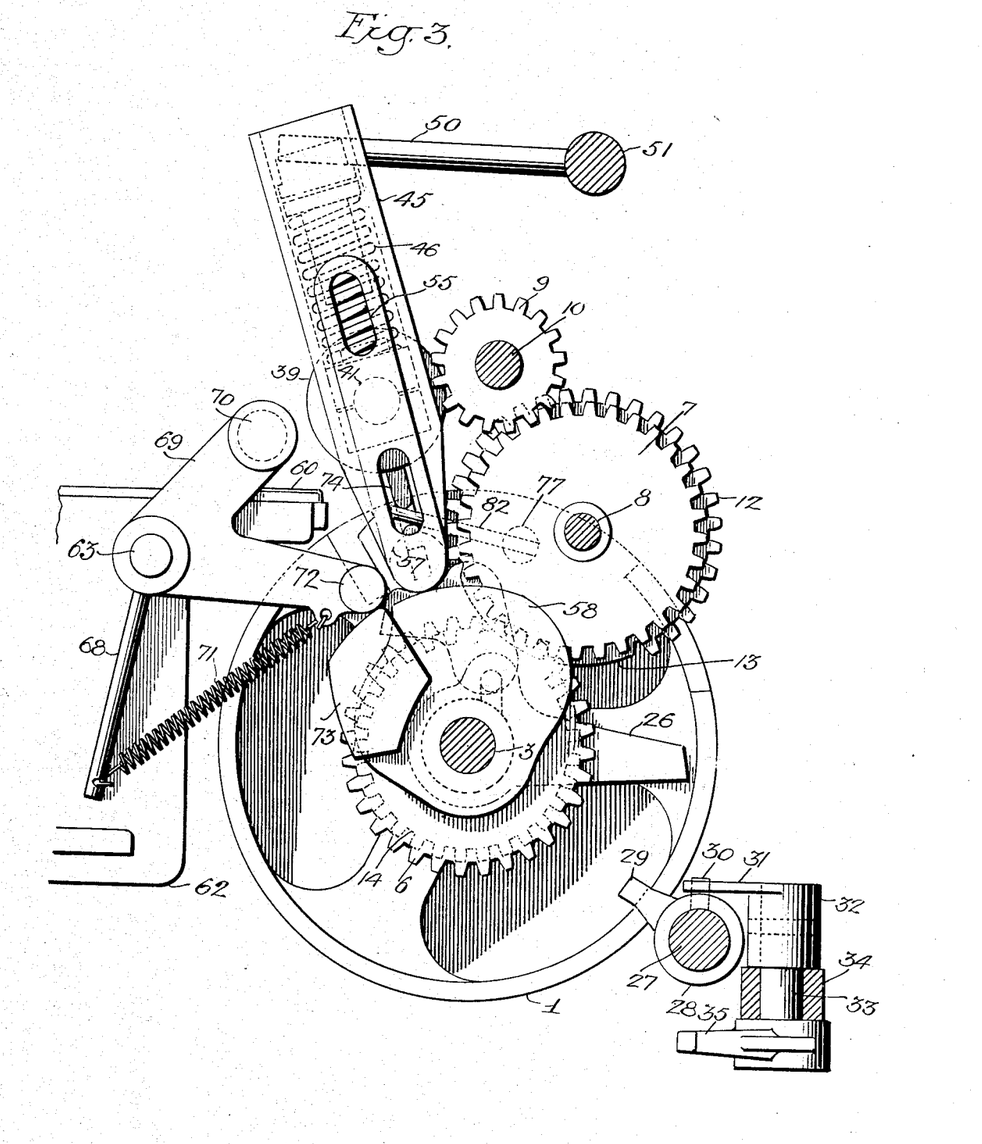
Fig. 3 is a similar view showing the parts in different positions.
Figure 4:
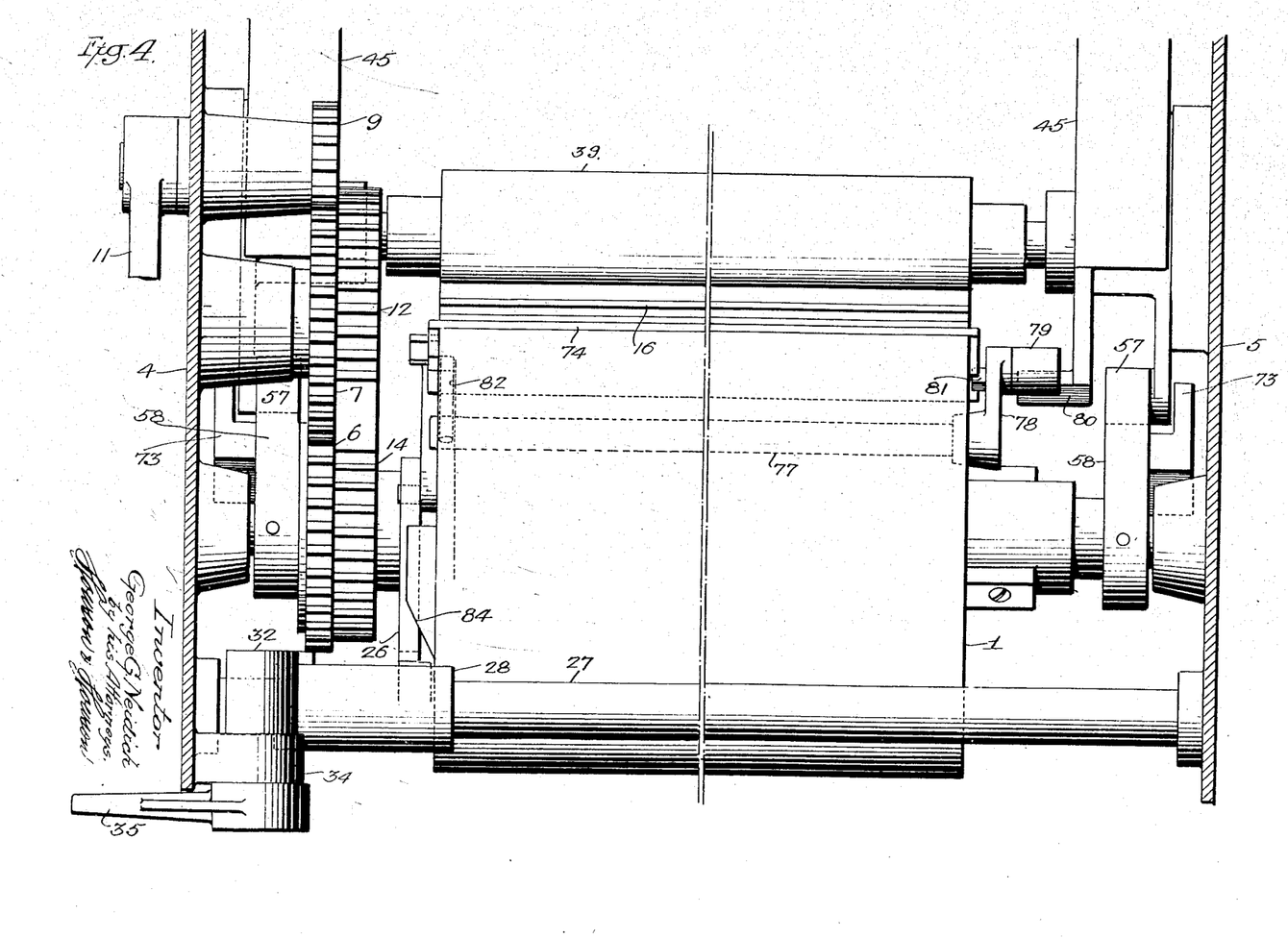
Fig. 4 is a sectional plan view taken directly above the pressure roll.
Figure 18:
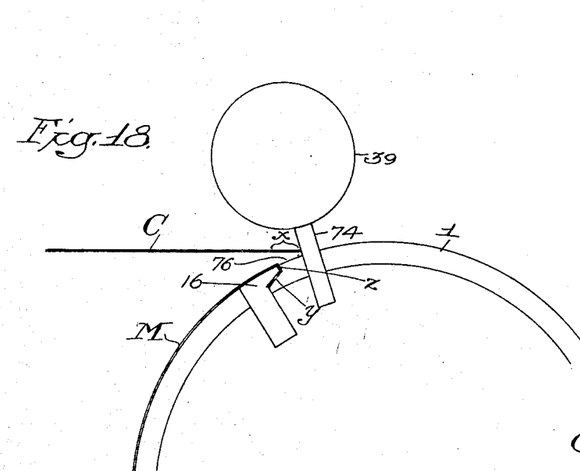

The crank 11 is now rotated until the pressure bar 70 is raised as shown in Fig. 3 by the engagement of cams 73 with rollers 72. At this time, the surface 13 (Fig. 2) of gear 12 will have come into engagement with the complementary surface 15 of gear 14 and, therefore, the master roll or drum 1 will remain stationary while the shaft 3 (Fig. 3) continues to rotate. Shortly after, the pressure roll 39 (Fig. 3) is raised by engagement of cams 58 with rollers 57 and, at the same time, roller 79 (Fig. 5) rides onto shoe 80 causing the guide or stop 74 to move upward along with the pressure roll, as depicted in Fig. 18. The crank 11 is then stopped while a copy sheet is slipped over the moistening device 60 until the front edge of the copy sheet engages the raised guide 74. It is important to note that the copy sheet is inserted in the absence of pressure, the pressure bar and the pressure roll being raised. Thus, the operator may insert the sheet freely until it abuts against the guide 74. No manipulation by the operator other than the simple insertion of the copy sheet is required. The crank 11 is then rotated again, causing rollers 57 to move off cams 58, thus lowering platen 39 against drum 1 and engaging the copy sheet between platen 39 and drum 1 with its foremost edge in contact with stop segment 74, as heretofore described. The lowering of the platen 39 is effected rapidly so that it quickly secures the copy sheet in the position established by the stop 74. Immediately thereafter, rollers 72 move off the cams 73, thus lowering the pressure bar 70 and pressing the copy sheet against the moistening member 60. Further rotation of the crank 11 brings the teeth of gear 12 into mesh with the teeth of gear 14, whereupon the master roll starts to rotate, drawing the copy sheet between the master roll and the pressure roll. As the copy sheet is fed through the machine, the pressure bar 70 exerts continued pressure on the copy sheet against member 60, thus insuring proper moistening of the sheet prior to the copying or duplication.

When the master roll has made a complete revolution and the pressure bar 70 is again raised, the copy sheet will have been discharged and the machine is ready to repeat the cycle of operation. The next copy sheet is inserted in the manner above described and this process is repeated until the desired number of sheets have been made.

When it is desired to remove the master sheet, the arm 29 (Fig. 3) is moved to operative position by manually moving lever 35 and the crank 11 is rotated until clamp 16 opens as above described. When the clamp opens, the edge of the master sheet is released and the sheet will be automatically ejected simply by continuing the rotation of crank 11, causing the sheet to feed between the master roll and the pressure roll until it is discharged in the same manner that the copy sheets are discharged.

As above described, the moistening of the copy sheets may be controlled to obtain light or dark copies. This adjustment merely requires the positioning of the handle 66 to effect the desired action of the moistening mechanism.

It will be noted that all of the parts of the device which are operated during the copying process are actuated by the crank 11. The same operating means which serves to rotate the master roll or drum also serves to effect actuation of the pressure bar 70, the pressure roll 39, the guide or stop 74, and the clamp 16. When the master sheet has been properly attached to the master roll and the moistening device has been adjusted as desired, the operator is required only to move the crank handle 11 in one direction during the entire duplicating process. Thus, the operator may use one hand to operate the crank and the other hand to feed successive copy sheets to the machine. This simplicity of operation of the device is an important feature of the invention.

The above-desired novel features which are embodied in the machine render it a marked improvement over prior devices of this class and enable the attainment of the desired objects heretofore stated. It will be understood, of course, that the invention is capable of modification within the scope of the appended claims without departure from the principles of the invention herein set forth.

I claim:

1. In a duplicating machine, a master roll adapted to carry a master sheet from which copies are to be made, a stop extending substantially the length of said roll movably seated in a recess in the roll and normally forming a part of the peripheral surface of said roll so as to provide a normally smooth and unbroken roll surface, operating means for actuating said master roll, and means operable by said operating means for projecting said stop outwardly from said roll in a position to be engaged by a copy sheet inserted in the machine, whereby the copy sheet is accurately positioned relative to the master sheet.

2. In a duplicating machine, a master roll adapted to carry a master sheet from which copies are to be made, means on said roll for clamping a predetermined marginal edge portion of the master sheet, operating means for rotating said master roll, means for actuating said clamping means at will to permit attachment or removal of the master sheet, a projectable stop on said roll spaced from said clamping means a distance equal to the length of said portion, means for causing cessation of the rotation of said master roll, and means for projecting said stop into a position to be engaged by an inserted copy sheet while the master roll is stationary, to thus align the copy sheet accurately with the master sheet.

3. In a duplicating machine, a master roll adapted to carry a master sheet from which copies are to be made, a clamp movably seated in a recess in said roll and adapted to clamp a predetermined marginal edge portion of the master sheet, operating means for rotating said master roll, means operable at will by said operating means for moving said clamp outwardly from said roll to permit attachment of a master sheet to said roll or to effect automatic ejection of a master sheet from the roll, a stop movably seated in a second recess of said roll spaced from the forward edge of said clamp a distance equal to the length of said edge portion, means for causing cessation of the rotation of said master roll, and means operable by said operating means while the master roll is stationary for projecting said stop outwardly from said roll in a position to be engaged by a copy sheet inserted in the machine, whereby the copy sheet is accurately aligned with the master sheet.

4. In a duplicating machine, a master roll adapted to carry a master sheet from which copies are to be made, a pressure roll adapted to press a copy sheet against the master sheet, operating means for rotating said master roll, means for causing cessation of the rotation of said master roll, means operable by said operating means while the master roll is stationary for moving said pressure roll away from said master roll to permit insertion of a fresh copy sheet in the absence of pressure, and means for preventing the insertion of the fresh copy sheet beyond the position of normal contact of the pressure roll with the master roll.

5. In a duplicating machine, a master roll adapted to carry a master sheet from which copies are to be made, a pressure roll adapted to press a copy sheet against the master sheet, movable bearings carrying said pressure roll, operating means for rotating said master roll, means for causing cessation of the rotation of said master roll, means operable by said operating means while the master roll is stationary for moving said bearings to carry said pressure roll away from said master roll to permit insertion of a fresh copy sheet in the absence of pressure, and means including a projectable stop on said master roll for preventing the insertion of the fresh copy sheet beyond the position of normal contact of the pressure roll with the master roll.

6. In a duplicating machine, a master roll adapted to carry a master sheet from which copies are to be made, a pressure roll adapted to press a copy sheet against the master sheet, a pair of opposed guides, bearings carried by said guides and carrying said pressure roll, operating means for rotating said master roll, means for causing cessation of the rotation of said master roll, means operable by said operating means while the master roll is stationary for moving said guides to carry said pressure roll away from said master roll to permit insertion of a fresh copy sheet in the absence of pressure, and means including a projectable stop on said master roll for preventing the insertion of the fresh copy sheet beyond the position of normal contact of the pressure roll with the master roll.

7. In a duplicating machine, a master roll adapted to carry a master sheet from which copies are to be made, a pressure roll adapted to press a copy sheet against the master sheet, a pair of opposed guides, bearings carried by said guides and carrying said pressure roll, springs in said guides arranged to exert pressure on said bearings, means for varying the tension of said springs at will, operating means for rotating said master roll, means for causing cessation of the rotation of said master roll, means operable by said operating means while the master roll is stationary for moving said guides against the action of said springs to carry said pressure roll away from said master roll to permit insertion of a fresh copy sheet in the absence of pressure, and means including a projectable stop on said master roll for preventing the insertion of the fresh copy sheet beyond the position of normal contact of the pressure roll with the master roll.

8. In a duplicating machine, a master roll adapted to carry a master sheet from which copies are to be made, operating means for actuating said roll, a pressure roll, and means for removably supporting said pressure roll in frictional engagement with said master roll, said last-named means including a pair of multi-part journal supports for said pressure roll, each of said supports comprising a pair of relatively movable cooperative bearing segments and a guide within which one of said segments is slidably disposed, spring means in each said guide for maintaining the movable bearing segment therein in cooperative relation with the other segment, and a common means for adjusting the tension of both of the spring means.

9. In a duplicating machine, a master roll adapted to carry a master sheet from which copies are to be made, operating means for actuating said roll, a pressure roll, and means for removably supporting said pressure roll in frictional engagement with said master roll, said last-named means including a pair of multi-part journal supports for said pressure roll, each of said supports comprising a pair of relatively movable cooperative bearing segments and a guide within which one of said segments is slidably disposed, spring means in each said guide for maintaining the movable bearing segment therein in cooperative relation with the other segment, means for adjusting the tension of each said spring means individually, and a common means for adjusting the tension of both of the spring means.

10. In a duplicating machine, a master roll adapted to carry a master sheet from which copies are to be made, means for feeding a copy sheet into engagement with the master sheet, means for moistening the copy sheet during the feeding thereof, means for supplying moistening fluid to said moistening means, means for exerting pressure on the copy sheet during the moistening thereof, means for varying the supply of moistening fluid to said moistening means, and a common means for controlling simultaneously said pressure-exerting means and said supply-varying means to increase the pressure on the copy sheet when the fluid supply is increased and vice versa.

11. In a duplicating machine, a master roll adapted to carry a master sheet from which copies are to be made, means for feeding a copy sheet into engagement with the master sheet, a device for moistening the copy sheet during the feeding thereof, a moistening-fluid reservoir, capillary means for carrying fluid from said reservoir to said moistening device, means for exerting pressure on the copy sheet during the moistening thereof, means for varying the fluid carried by said capillary means to said moistening device, and a single means for controlling simultaneously said pressure-exerting means and said fluid-varying means to increase the pressure on the copy sheet when the fluid is increased and vice versa.

12. In a duplicating machine, a master roll adapted to carry a master sheet from which copies are to be made, means for feeding a copy sheet into engagement with the master sheet, a device for moistening the copy sheet during the feeding thereof, a moistening-fluid reservoir, capillary means for carrying fluid from said reservoir to said moistening device, a pressure bar for pressing the copy sheet against said moistening device, means for exerting variable pressure on said capillary means to control the fluid carried thereby, independent means for varying simultaneously the effectiveness of said bar and said pressure-exerting means to thereby increase the pressure on the copy sheet when the fluid is increased and vice versa, and means for raising said pressure bar at a predetermined time during each cycle of operation to permit insertion of a copy sheet.

13. In a duplicating machine, a master roll adapted to carry a master sheet from which copies are to be made, a pressure roll adjacent to said master roll, a projectable stop on said master roll, a moistening device adjacent to said master roll, a pressure bar adjacent to said moistening device, operating means adapted for continuous cyclic operation, means operable by said operating means for effecting intermittent operation of said master roll, and means operable by said operating means for actuating said pressure roll, said stop and said pressure bar while said master roll is stationary.

14. In a duplicating machine, a master roll adapted to carry a master sheet from which copies are to be made, a pressure roll adapted to press a copy sheet against the master sheet, operating means for rotating said master roll, means for causing cessation of the rotation of said master roll, means operable by said operating means while the master roll is stationary for moving said pressure roll away from said master roll to permit insertion of a fresh copy sheet in the absence of pressure, and means for aligning the inserted copy sheet with the master sheet while said pressure roll is away from said master roll and while the master roll is stationary.

15. In a duplicating machine, a master roll adapted to carry a master sheet from which copies are to be made, means on said roll movable from an inoperative position to an operative position for locating a copy sheet relative to the master sheet, operating means for said roll adapted for continuous cyclic operation, means for causing cessation of the rotation of said roll during a predetermined period of each operating cycle, means operable by said operating means for moving said locating means to operative position at a predetermined time during the quiescent period of said roll, thereby permitting the positioning of a copy sheet while said roll is stationary, and means arranged cooperatively with said roll to grip the copy sheet during the quiescent period of said roll, whereby the copy sheet is securely held in proper relation to the master sheet prior to resumed rotation of the master roll.

16. In a duplicating machine, a master roll adapted to carry a master sheet from which copies are to be made, a pressure roll adjacent to said master roll for pressing a copy sheet against the master sheet, a stop movably seated in a recess in said master roll, operating means for said master roll adapted for continuous cyclic operation, means for causing cessation of the rotation of said master roll when said stop is aligned with said pressure roll and for causing the master roll to remain stationary during a predetermined period of each operating cycle, means operable by said operating means for moving said pressure roll away from said master roll when said stop is aligned with the pressure roll, means operable by said operating means for projecting said stop outwardly from said master roll simultaneously with the movement of the pressure roll, thereby permitting the positioning of a copy sheet against said stop in the absence of pressure while said master roll is stationary, and means for returning said pressure roll to its position adjacent said master sheet during the quiescent period of said master roll, whereby the copy sheet is securely gripped and held in proper relation to the master sheet prior to resumed rotation of the master roll.

17. In a duplicating machine, a master roll adapted to carry a master sheet from which copies are to be made, a pressure roll adjacent to said master roll for pressing a copy sheet against the master sheet, moistening means disposed adjacent to said master roll so as to be engaged by a copy sheet fed to the machine, a pressure bar adjacent to said moistening means and adapted to press the copy sheet against the moistening means, a stop movably seated in a recess in said master roll, operating means for said master roll adapted for continuous cyclic operation, means for causing cessation of the rotation of said master roll when said stop is aligned with said pressure roll and for causing the master roll to remain stationary during a predetermined period of each operating cycle, means operable by said operating means for moving said pressure bar away from said moistening means during the quiescent period of said master roll, means operable by said operating means for moving said pressure roll away from said master roll while said stop is aligned with the pressure roll, means operable by said operating means for projecting said stop outwardly from said master roll simultaneously with the movement of the pressure roll, thereby permitting the positioning of a copy sheet against said stop in the absence of pressure while said master roll is stationary, means for returning said pressure roll to its position adjacent said master sheet during the quiescent period of said master roll, whereby the copy sheet is securely gripped and held in proper relation to the master sheet prior to resumed rotation of the master roll, and means for returning said pressure bar to its normal position prior to resumed rotation of the master roll.

18. In a duplicating machine, a master roll adapted to carry a master sheet from which copies are to be made, a pressure roll adapted to press a copy sheet against a master sheet, a pair of opposed guides, bearings carried by said guides and carrying said pressure roll, operating means for actuating said master roll intermittently, means operable by said operating means for moving said guides to carry said pressure roll away from said master roll, a movable stop bar on said master roll, means to elevate the stop bar coincident with the elevation of the pressure roll during the quiet portion of the master roll cycle, and means for depressing such stop bar and coincidentally bringing the pressure roll into tight frictional contact with the master roll during the quiet cycle of the master roll, whereby the copy sheet is fastened between the pressure roll and the master roll in an exact location relative to the printing copy surface on the master roll.

GEORGE G. NEIDICH.